United States Patent [19]
Baldwin et al.

[11] Patent Number: 5,133,872
[45] Date of Patent: Jul. 28, 1992

[54] METHOD AND APPARATUS FOR CONTROLLING THROUGHPUT IN A BELTPRESS

[75] Inventors: Peter I. Baldwin, Wilmslow; Kathryn E. McKell, Stockport, both of England; Khai Tran, Houston, Tex.

[73] Assignee: Ashbrook-Simon-Hartley Corporation, Houston, Tex.

[21] Appl. No.: 647,636

[22] Filed: Jan. 31, 1991

[51] Int. Cl.⁵ .................. C02F 1/52; C02F 11/14; B01D 37/03; B01D 37/04
[52] U.S. Cl. .................. 210/709; 210/739; 210/745; 210/746; 210/783; 210/96.1; 210/105; 210/206; 210/386; 210/401
[58] Field of Search ............... 210/386, 400, 783, 739, 210/746, 770, 732, 206, 96.1, 105, 745, 709, 143

[56] References Cited

U.S. PATENT DOCUMENTS

| | | | |
|---|---|---|---|
| 3,984,329 | 10/1976 | Wenzel et al. | 210/386 |
| 4,142,971 | 3/1979 | Le Fur et al. | 210/386 |
| 4,576,723 | 2/1986 | Eisenlauer et al. | 210/709 |
| 4,587,023 | 5/1986 | Srivatsa et al. | 210/783 |
| 4,612,123 | 9/1986 | Eustacchio et al. | 210/96.1 |
| 4,675,116 | 6/1987 | Hoyland | 210/709 |
| 4,681,033 | 7/1987 | Crandall et al. | 210/386 |
| 4,707,272 | 11/1987 | Kistler | 210/709 |
| 4,836,100 | 6/1989 | Johnson et al. | 100/118 |
| 4,867,886 | 9/1989 | Botkins, Jr. | 210/745 |
| 4,990,261 | 2/1991 | Ho | 210/96.1 |
| 5,021,166 | 6/1991 | Torpey | 210/400 |

Primary Examiner—Ernest G. Therkorn
Attorney, Agent, or Firm—Foley & Lardner

[57] ABSTRACT

A beltpress controller performs on-line measurements of output sludge cake thickness. A controller takes a product of the measured cake thickness with belt speed, moisture content and belt width to determine a rate of dry solid output per unit time. The calculated rate is compared with a desired rate and the sludge flow rate is adjusted by adjusting the speed of a sludge feed pump to obtain the desired dry solid output rate. In systems which mix polymer with the sludge to increase the dewatering efficiency, the sizing of a mixing orifice through which the sludge and polymer is provided is adjusted to maintain a substantially constant mixing energy. This prevents errors in the streaming current detector which measures the amount of excess polymer in the filtrate and the controller adjusts the speed of a polymer dosing pump accordingly.

30 Claims, 5 Drawing Sheets

FIG. 3 THROUGHPUT CONTROL LOOP FLOW CHART

METHOD AND APPARATUS FOR CONTROLLING THROUGHPUT IN A BELTPRESS

BACKGROUND OF THE INVENTION

1. Field of the Invention

The invention relates to a method and apparatus for regulating throughput in a beltpress machine.

2. Related Art

Beltpress machines are used in a variety of applications, including processing sludge and separating juice and pulp from fruit. The machine is basically operated on the principle of pressing feed material such as sludge or fruit between two moving belts. The pressing is accomplished by moving the belts over a series of rollers and sequentially narrowing the spacing between the belts so as to press the feed material therebetween. During the pressing operation, water or juice is forced outward through the belts or beyond their edges and is collected by suitable means. At the end of the pressing operation, the partially dewatered feed material is expelled from the belts.

Each of the pair of belts used for the pressing operation is moved over separate drive and idler rollers in an endless loop. Typically, feed material is deposited on one of the belts at a section where the belt is horizontally aligned and the deposited feed material is moved along by the one belt and brought into contact with the opposing belt. In one known beltpress, described in U.S. Pat. No. 3,984,329 to Wenzel, the feed material is brought into contact with the opposing belt at a section where both belts are sharply vertically inclined. In this beltpress, the feed material is initially squeezed between the belts as it slides downward between the vertically inclined section of the belt in a chute-like manner. In another known beltpress, the feed material is brought into contact with the opposing belt at a section of the beltpress where two opposing belts are approximately horizontal.

Differences in the rate of travel of each belt can arise when feed material of varying thickness is initially pressed. This differential rate of travel of the two belts leads to undesirable consequences including one of the belts folding on itself, often necessitating shutdown of the beltpress operation to unfold the belt. U.S. Pat. No. 4,836,100 to Johnson et al. employs a squeeze plate operatively connected to a rotating pipe mounting on the frame of the beltpress. The vertical spacing between the squeeze plate and the pipe varies during rotation of the pipe so that the squeezing action of the plate can be selectively varied.

Sludge generally can be grouped into three categories: biological, mineral and industrial. Water is normally held in these materials at three different levels, each requiring a different method of removal. Free water, which is sludge retained water, can be easily removed by sedimentation or normal drainage. Intercellular water is held to the sludge particles by specific chemical bonding, requiring the use of the polymer to break the bond. Intracellular water is contained inside the individual cells of the sludge, and can be removed only by using costly processes to break the cell wall.

It is known to mix a polymer into a sludge as a flocculate. Polymers have played an increasingly important role in waste water treatment and today they are one of the most important factors in sludge dewatering. When mixed with the sludge, polymers combine with the charged particles, neutralizing the charge which permits the agglomeration of the particles. For example, a positively charged polymer is introduced into negatively charged municipal sludge. This causes the polymer and the sludge to coagulate resulting in the separation of water and other liquids. This process, called flocculation, releases the free and intercellular water which results in a sludge that can be mechanically dewatered.

It is also known to use a combination of gravity and mechanical pressure to process sludge. By evenly distributing the flocculated sludge on a porous belt, the free water, which is often over 50% of the sludge volume is removed by gravity. In both a low and high pressure compression stage, the sludge is "sandwiched" between two belts and routed over various size rollers to create a pressure/shear effect, which removes additional water and produces a cake ready for disposal.

Cost effective implementation of such systems requires the efficient use of such polymers. Conventional systems have relied on manual manipulation to regulate mixing of the polymer with the sludge. For example, an operator first visually inspects the output cake. Based on manually observed cake thickness, rather than on automatic or mechanically assisted measurements, the operator adjusts an insert feed plate to obtain a desired cake thickness output. Often the operator fails to adjust the feed plate, resulting in inefficient system operation, excess water in the output cake product and overconsumption of polymer.

Other conventional systems have employed a Streaming Current Detector to measure charge in a sludge polymer mix and adjust the polymer flow. Another conventional system has also adjusted the mixing energy based on the charge measurements of a Streaming Current Detector. Other approaches to controlling polymer flow have also been employed. In another system, the rheology of a sample of flocculated material is determined, compared to a baseline and polymer flow is adjusted accordingly. Another system measures refracted light in a gravity portion of the system and the polymer flow is increased or decreased according to the measurement.

The conventional systems discussed above fail to recognize that one factor in determining how the polymer is to be mixed with the sludge to obtain an output rate of dry solids is the rate at which the sludge is introduced into the beltpress. Thus, such conventional systems are limited in their ability to regulate the dewatering process because they do not regulate sludge flow based on characteristics, such as thickness, of the cake produced for disposal.

SUMMARY AND OBJECTS OF THE INVENTION

In view of the above limitations of the related art, it is an object of the invention to provide a method and apparatus for regulating the dewatering process in a beltpress controller using on-line measured characteristics of the cake output produced for disposal.

It is another object of the invention to measure on-line parameters of the output cake which indicate the effectiveness of the dewatering process.

It is still another object of the invention to regulate automatically control loops in a beltpress controller based on output cake parameters and on system performance parameters.

It is still another object of the invention to adjust sludge throughput according to on-line belt speed and on-line measured cake thickness.

It is a further object of the invention to determine cake thickness based on an average of a plurality of cake thickness sensors.

It is still another object of the invention to calculate the volume of output cake per unit time based on the measured cake thickness and belt speed.

It is a still further object of the invention to determine the moisture content of the output cake and calculate a measure of dry solids per unit time of output cake.

It is another object of the invention to control the sludge throughput by adjusting the speed of a sludge input device to maintain a set throughput and a desired rate of output cake dry solids over a period of time.

It is still another object of the invention to control the sludge/polymer mixing energy in response to sludge throughput.

Still another object of the invention is to detect excess polymer in filtrate water and adjust the rate of a polymer injection device to feed the amount of polymer necessary for optimum flocculation.

These and other objects of the invention are accomplished by a beltpress controller having a plurality of cake thickness sensors at an output portion of the beltpress. The cake thickness sensors measure the thickness of the output cake over the width of the belt. The average of these values over the width of the belt operating at a given speed is used to find the volume of output cake per unit time. When the average cake thickness is combined with the belt speed, cake width, and level of cake moisture, the output of dry cake solids per unit time can be determined and compared with a desired value. The sludge throughput can then be adjusted to obtain the desired value. As a function of the throughput, the mixing of sludge with a polymer can be controlled by adjusting the position of a mixing orifice plate or insert feed plate based on the sludge flow rate. A streaming current detector detects excess polymer in the filtrate water and adjusts the rate of a polymer dosing pump to feed the optimum amount of polymer necessary for flocculation. Thus, the measurement of cake thickness provides the ability to more accurately control the dewatering process.

BRIEF DESCRIPTION OF THE DRAWINGS

The invention will be described, with particularity, with reference to the drawings in which.

DETAILED DESCRIPTION OF THE EMBODIMENTS

In a beltpress system according to the invention, material to be deliquified or dewatered is supplied to the beltpress at a controllable rate through a variable speed feed pump. The material, such as sludge, is conveyed through the beltpress between at least two belts, which are separated by a progressively smaller distance as the sludge moves through the beltpress. As a result liquid is squeezed from the sludge. Dewatered material in the form of cake is produced at the output of the beltpress. One or more thickness sensors measures the thickness of the cake. If multiple sensors are used, an average thickness can be determined. Given the width of the belt and the belt speed, the thickness information is used to determine the volume of output cake per unit time. Moisture content is then evaluated and, with the volume information derived from the thickness data, the output dry solids per unit time is determined. The output dry solids per unit time is compared against a setpoint and the speed of the variable speed feed pump is adjusted to achieve the desired rate. Thus, at a known moisture content, on-line measured cake thickness and belt speed are used by a controller to control sludge throughput by causing adjustment of the sludge feed pump speed.

To enhance dewatering, a polymer is mixed with the sludge. Polymer is supplied by a polymer dosing pump through an insert feed plate. The position of the insert feed plate controls the mixing energy. The position of the plate is adjusted according to sludge flow rate. Since sludge flow rate is set according to the rate of output dry solids per unit time, as determined by the on-line measured output cake thickness and belt speed, the position of the plate is related to cake thickness and belt speed. In addition, a streaming current detector measures the charge in the filtrate from the beltpress causing the speed of a polymer dosing pump to be adjusted accordingly.

Figure 1:
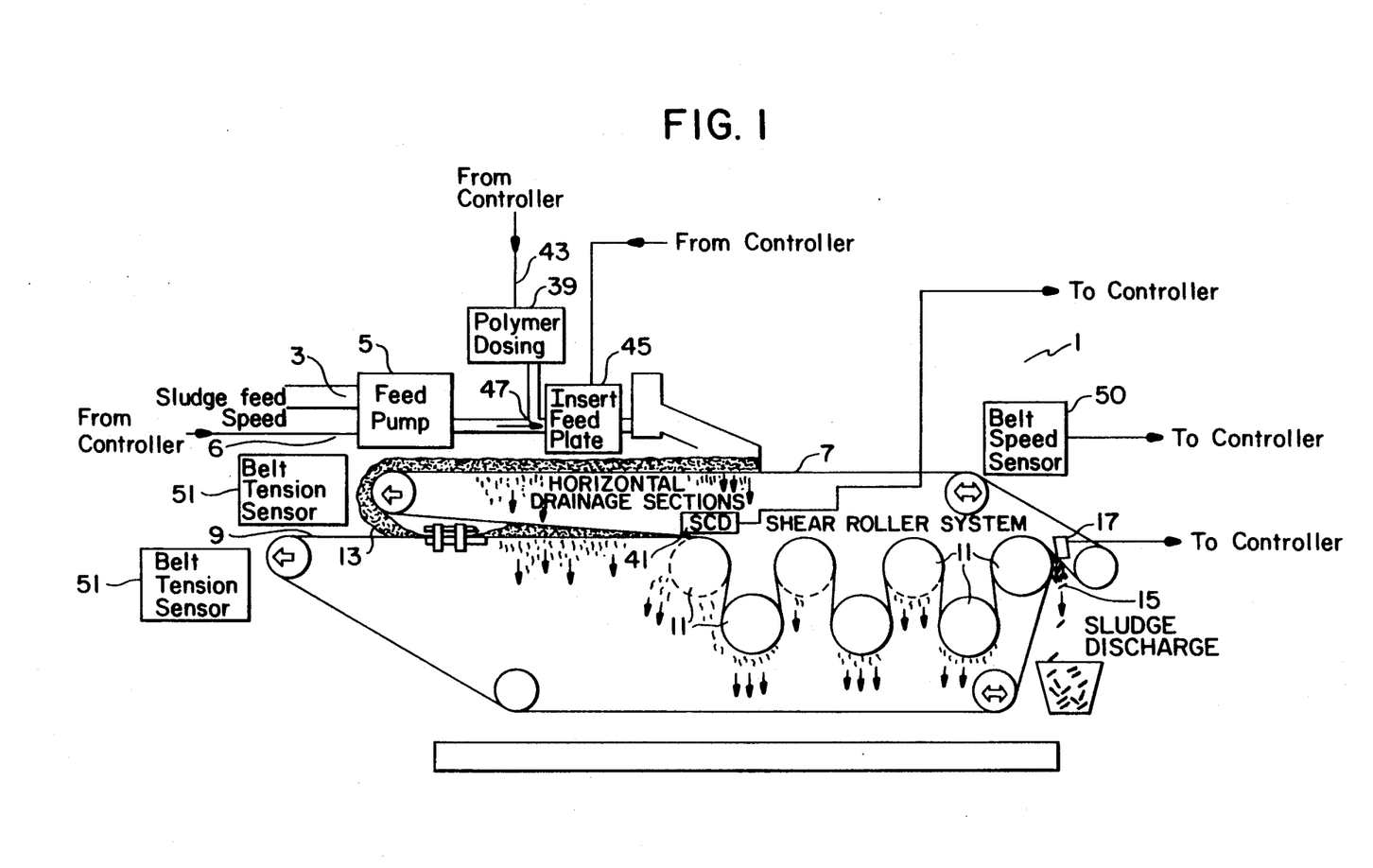
FIG. 1 is a schematic representation of a beltpress machine of the horizontal press type.

FIG. 1 illustrates a beltpress system 1 according to the invention. Feed port 3 is supplied with product for dewatering by variable speed feed pump 5 having a speed control input 6. The variable speed sludge pump 5 thus controls the rate of sludge flow, e.g. in gallons per minute. Within the beltpress I a pair of endless loop pressing belts 7 and 9 are used. The belts are moved over a series of rollers so as to squeeze liquid or other material from feed material 13, which is deposited on belt 7 by variable speed feed pump 5. The dewatered material is expelled after passage through the roller section as cake 15.

Figure 4:
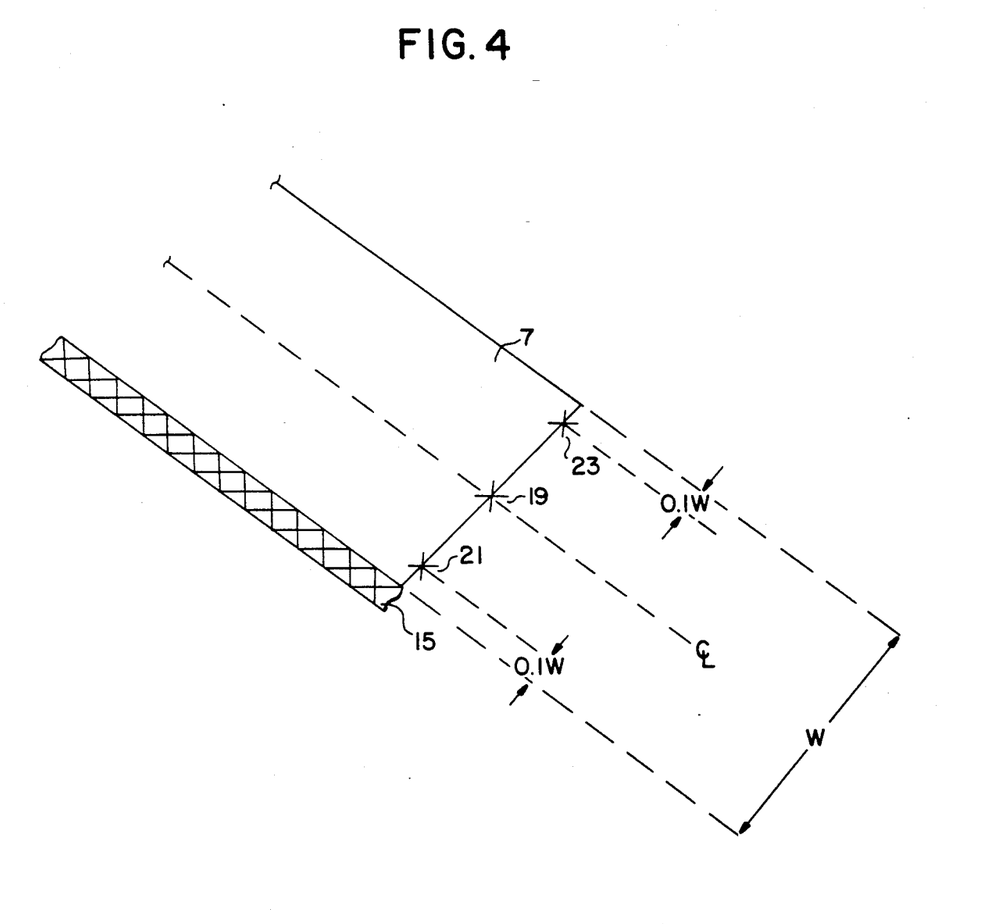
FIG. 4 illustrates the location of cake thickness sensors.

Before the cake is expelled one or more thickness sensors 17 measures the thickness of the expelled cake. As shown in FIG. 4, preferably three thickness sensors are located across the width of the belt used. One sensor 19 is located at the approximate center of the belt width, while the remaining two sensors 21 and 23 are located near the edges of the belt, inset from each edge by approximately 10% of the belt width, W. The cake thickness measured by these three sensors is averaged to arrived a single cake thickness value for a particular point in the time. Cake thickness can be measured continuously and sampled periodically, as required, to calculate the rate of output dry solids per unit time. Typically, cake thickness is sampled about once per minute and dry solid output rate is calculated in pounds of dry solids per hour. In the event that the cake thickness measurement results in adjustment of the variable speed sludge pump 5, the next cake thickness measurement can be delayed to allow time for the alteration of the feed pump 5 to affect the calculated rate of dry solids per unit time.

Figure 5:
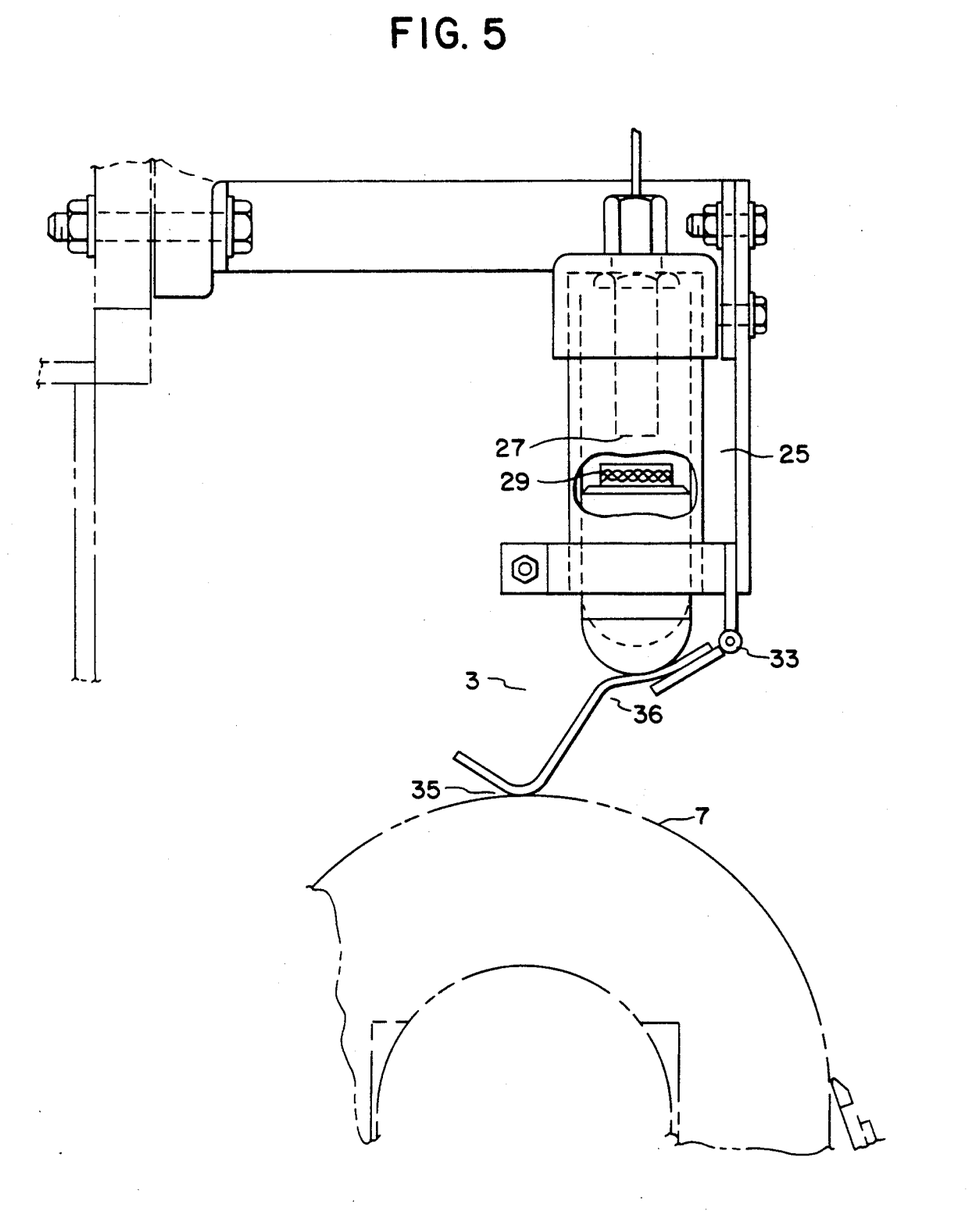
FIG. 5 illustrates an example of a cake thickness sensor employing a proximity sensor.

Cake thickness can be measured using electromechanical, optical, or ultrasonic techniques. As an example, an electromechanical implementation of a thickness sensor employs a proximity sensor 25, such as the Electro-Mike Displacement Transducer made by Electro Corporation. Such displacement transducers generate a low level RF field in front of a sensor 27 so that eddy currents generated by a metal target 29 intercepted by the field disrupt the Q (Quality Factor) of the sensor. The change in Q is proportional to the distance from the sensor to the metal target 29. A typical linear gap range between the sensor and the target for such a sensor is 0.050 inches to 0.500 inches. However, the range of cake thickness to be measured is typically between 0.250 inches and 0.750 inches. As a result, it is necessary to employ transition portion 31 attached to pivot 33 in order to translate the cake thickness range to a range compatible with the proximity sensor.

As shown in FIG. 5, a lower portion 35 of the transition portion contacts upper belt 7. As cake thickness decreases, the distance between the upper and lower belts also decreases. This causes the upper portion 36 of transition portion 31 to move via pivot 33 in a downward direction, increasing the distance between sensor 27 and metal target 29 in the switch assembly 25. The sensor provides to controller 37 a signal which typically varies between 4 mADC and 20 mADC depending on the measured cake thickness. It will be known to those of ordinary skill that a controller can be employed to use other suitable signals and signal ranges and that the above is by way of illustration and not limitation. In addition, those of ordinary skill will be aware that the proximity detector discussed above is also by way of illustration and not limitation, as any suitable optical, ultrasonic or other proximity sensor can be employed.

FIG. 1 further shows polymer dosing pump 39, which mixes polymer with the input sludge to enhance dewatering. Streaming Current Detector (SCD) 41 measures particle charge on a treated sample by continuously drawing portions of the sample into a sealed chamber. Particles which have not reacted with the polymer tend to adhere to the surface of the chamber. Thus immobilized, they are subjected to a high velocity stream created by the motion of a reciprocating piston which drew the sample into the chamber. This stream severs ions from the loosely bound counterion layer surrounding each particle, forcing them to move in the same direction as the stream and creating an alternating electric current. This current is rectified and amplified and used as an input to controller 37 for controlling polymer dosing. This is accomplished by controlling the speed of the polymer dosing pump via the speed control output 43, from controller 37, based on the difference between the current SCD reading and a desired SCD reading. For a cationic polymer, as the residual polymer level decreases, the SCD reading decreases and the pump speed is altered so that the desired SCD reading is achieved. In the case of anionic polymers, the SCD reading increases as the polymer decreases, and again the polymer dosing pump speed is altered to achieve the desired SCD value.

Polymer is mixed with sludge through an insert feed plate 45, which adjusts the size of the mixer orifice 47. Insert feed plate 45 varies from 0% open, where the mixer orifice is closed, to 100% open, where the mixer orifice is fully open. In the full open position, little mixing energy exists. As the insert feed plate 45 closes the orifice, turbulence is increased thereby increasing the mixing energy. The position of the insert feed plate 45 is determined by the sludge flow rate. As the sludge flow rate increases, the insert feed plate is opened further to reduce the mixing energy. As previously discussed, in the system according to the invention, sludge flow rate is a function of output dry solids per unit time as determined from on-line measured cake thickness and belt speed from sensor 50. Since the position of the insert feed plate 45 is a function of sludge flow rate, in the system according to the invention, mixing energy is related to output cake thickness.

Sludge throughput, mixer energy and polymer dosing are controlled as individual control loops through controller 37. The polymer dosing control loop is typically a proportional plus integral plus derivative (PID) loop which receives a signal, typically between 4mADC and 20mAdC, from the SCD 41 and transmits a signal to the speed control input 43 of polymer dosing pump 39. Such PID loops for polymer dosing loops are conventional. As previously discussed, when the polymer level decreases, the SCD reading decreases. The controller 37 responds by signalling the polymer dosing pump to operate faster to increase the polymer dosing to the desired level. The controlled variable is the SCD setpoint and the manipulated variable is the polymer dosing pump speed.

Figure 2:
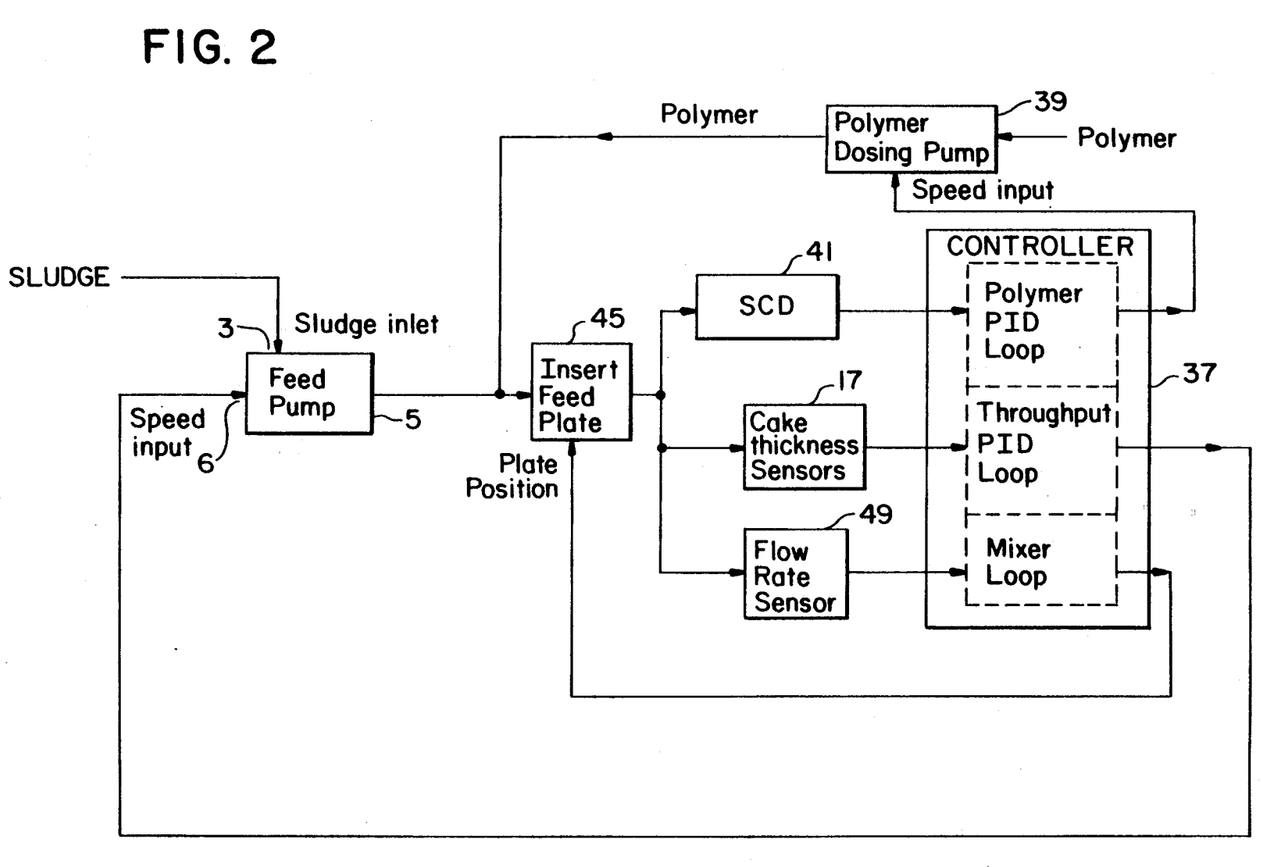
FIG. 2 is a block diagram of a control system according to the invention.

The controller 37 also operates a sludge throughput control loop as illustrated in FIG. 2. The sludge throughput control loop is typically a proportional plus integral plus derivative (PID) control loop which operates to adjust sludge feed pump speed based on the cake thickness measured on-line by the cake thickness sensors. The cake thickness sensors discussed above typically provide signals between 4mADC and 20mADC, depending on the measured thickness, to controller or processor 37. The proportional gain and the derivative and integral times for the PID loop are determined from the response of the controlled variable to a step change in the manipulated variable. The manipulated variable is sludge feed pump speed. The controlled variable is the dry solid throughput in pounds of dry solid per hour as calculated from the cake thickness measured, belt speed, cake width and cake moisture.

Belt speed can be measured by known techniques, for example, using a magnetic pickup. Cake width is typically set by the width of the belts 7 and 9. However, cake width could also be a measured value. Similarly, cake moisture can be programmed into controller 37 after the moisture content of an output sample is determined using known techniques, for example by heating the sample in an oven. Alternatively, cake moisture can be an on-line measured value determined by any suitable moisture sensor.

Controller 37 periodically determines the rate of output dry solids by calculating the product of the cake thickness, cake width, belt speed and moisture content represented as a percentage of dry solids. The product of the cake thickness, cake width and belt speed is the volume of output cake. In order to obtain the desired rate of dry solids per unit time (typically lbs/hr), controller 37 causes the speed of the sludge feed pump to be varied accordingly, thus controlling sludge flow. The above calculations are typically performed on at least one output cake sample per minute. However, following adjustment of sludge feed pump speed, a time delay can be built in to allow the adjusted sludge pump speed to have an effect on the cake output.

Figure 3:
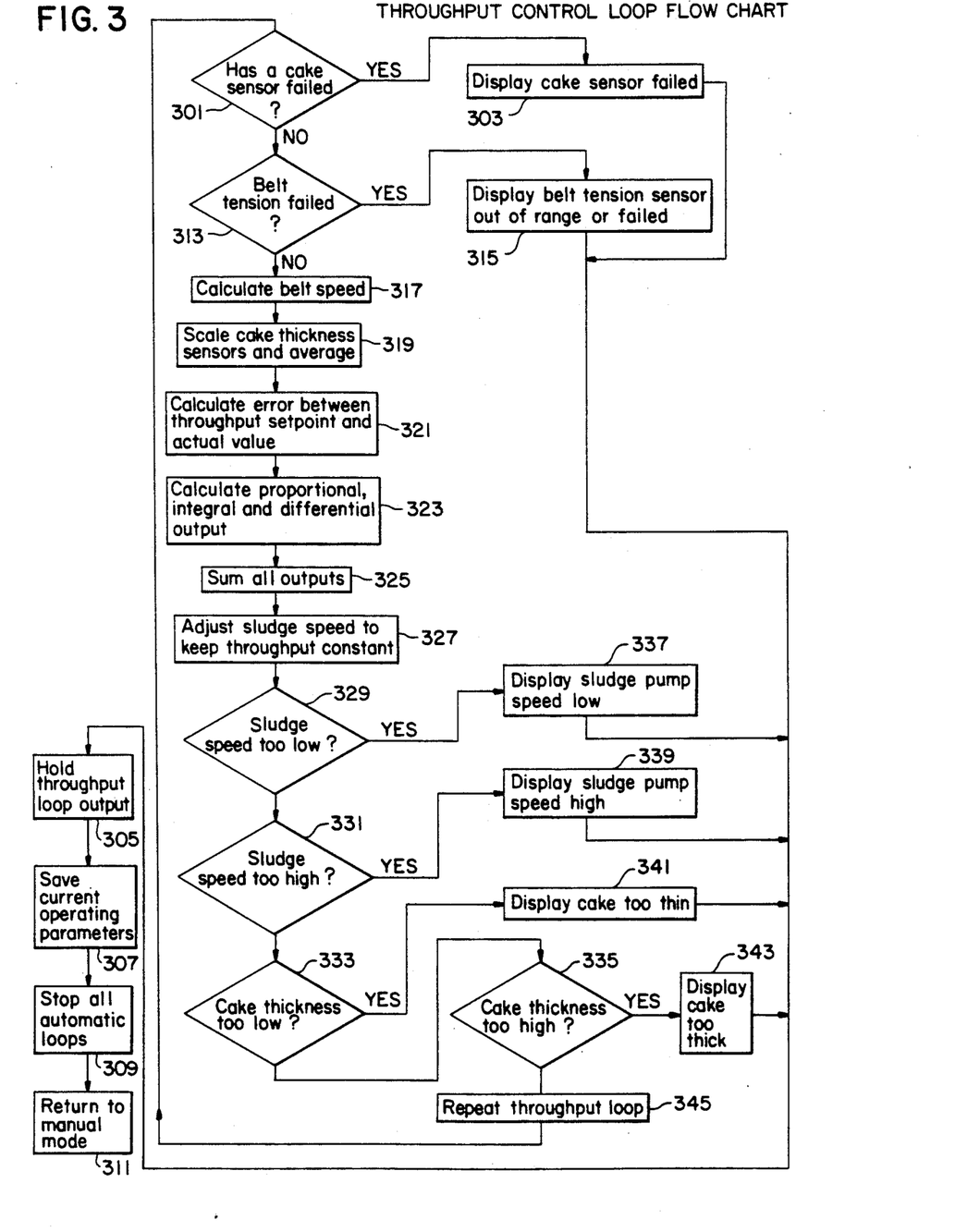
FIG. 3 is a flow diagram showing the sequence of steps in the method of throughput control.

FIG. 3 is a flow diagram showing steps in sludge throughput control according to the method of the invention. In step 301 the integrity of the cake sensors is determined. This is accomplished by testing each cake sensor to determine if an analog output within the expected range is present. If a cake sensor test is failed, control passes to step 303 which causes the failure to be displayed on a video display or to be indicated by some other indicator, such as an audio indicator. Control then passes to step 305 which results in holding or pausing the operation of the sludge throughput control loop. The current operating parameters are saved, all automatic loop operation is halted and the system is placed in a manual mode in steps 307, 309, and 311 respectively.

If the cake sensors are operational, control is passed to step 313 in which belt tension is checked. If belt tension measured by conventional sensors 51, is out of the specified range, step 315 causes the condition to be indicated to an operator and control passes to steps 307, 309, and 311, previously described to put the system in a manual mode.

It is also possible to perform other tests before proceeding to the next loop step. For example, the SCD signal, mixer position sensor, and sludge flow sensors can all be tested to determine if they are operating within expected ranges, e.g. 4mADC to 20mADC. It should be noted that the operational ranges of the sensors are by way of example and not by way of limitation, as it would be known to those of ordinary skill that any suitable sensors could be employed and that the operational ranges of such sensors can be scaled to appropriate signal levels.

Upon successful completion of testing in step 313, control is passed to step 317 where belt speed is calculated. As previously discussed belts 7 and 9 are operated at substantially the same speed. A magnetic pickup device operates continuously counting pulses. By periodically multiplying the count by a constant, the number of belt revolutions per unit time, or belt speed, is determined. It is also known to those of ordinary skill that by measuring the time between pulses and dividing this into a constant, the belt speed may be determined.

In step 319, the cake thickness is measured, scaled and the average of a plurality of sensors, e.g., 19, 21, 23, situated as previously described across the width of the belt, is determined. In a typical scaling approach, the sensor position is measured as a percentage of full scale so that a mm value times 1000 is obtained. The values are then summed and divided by 300 to obtain a scaled value in mm times 10 units. The cake thickness is measured periodically at a rate determined by the time constant of the throughput control loop. One typical example is performing cake thickness measurements every 60 seconds.

In step 321 the controller 37 calculates the error between the throughput setpoint and the actual value. The first step in this calculation is the determination the average density of the cake. This is calculated based on the average density of the dry solids and the density of water in pounds per cubic foot along with the current moisture content according to the following equation.

$$AVDENS = [CM \times SD + (100 - CM) \times WD]/100$$

where
AVDENS is the average density of dry solids in lb/cu ft.
CM is cake moisture as a percent
SD is solids density in lb/cu ft.
WD is water density in lb/cu ft.

Throughput can then be calculated using the average density and cake moisture to arrive at throughput of dry solids in pounds per hour by applying the following equation. It should be noted that it may be convenient to perform the calculation in units compatible with the sensors, e.g. in $cm^3/min$, and convert to desired units, e.g., $ft^3/hr$.

$$TH = \frac{BS \times CT \times W \times AD \times CM}{100}$$

where
TH = throughput in lbs/hr
BS = Belt speed in ft/hr
CT = Current cake thickness in feet
W = Width of belt in feet
AD = Average density of cake in lb/cu ft.
CM = Cake moisture in %.

The error is simply the difference between the throughput setpoint and the current throughput calculated from the cake thickness and other parameters, as described above.

In step 323 the proportional, integral and derivative outputs for the control loop are calculated by controller or processor 37. The proportional output of the loop is the product of the gain and the error. The gain is set at system commissioning based on the output of the controller and the signal levels required for compatibility with the speed control input of the sludge feed pump 5. The integral term may be limited due by the integer range of the processor or controller 37. The derivative term and current error are also calculated and placed in a register. The equations for calculating the proportional, integral and derivative terms are given as:

$$P = (THS - THC) \times TK$$

where,
THS = throughput set point in lb/hr.
THC = throughput calculated in lb/hr.
TK = throughput proportional constant
P = proportional output $$I = (THVIP + P) \times \frac{TS}{TI} \qquad b)$$

where,
THVIP Past value of integral output calculated at TS-1
P = Proportional output
TS = Sample time constant in secs
TI = Integral time constant in secs
I = Integral output $$D = (E - EP) \times \left( TK \times \frac{TD}{TS} \right) \qquad c)$$

where,
D = Derivative output
E = Current error ((THS - THC), as above)
EP = Past error calculated at TS-1
TK = Proportional constant
TD = Derivative time constant in secs
TS = Sample time constant in secs.

$$THSUM = P + I + D + SLSP$$

where,
P,I,D are as above
THSUM is output value
SLSP is sludge speed setpoint

In step 325 the above proportional, integral and derivative output terms are summed with the current measured sludge speed to arrive at total output term which is converted to a percent sludge pump speed adjustment required.

In step 327, the sludge feed pump speed is adjusted to maintain a constant throughput of output dry solids, based on the above calculations. It should be noted that the actual speed of the sludge feed pump is a function of the moisture content of the output cake. For example, if moisture content in the output cake of a second sample is 10% greater than the moisture content of the output cake in a previous sample, the sludge flow must be increased to maintain a constant rate of output of dry solids. This is accomplished by controller 37 which adjusts the speed of the sludge feed pump 5 by generating signals to vary the speed control 6.

In steps 329, 331, 333, and 335, respectively high and low limits for sludge speed and cake thickness are compared with the corresponding measured parameter. from a minimum of three points, by the processor controller 37.

It should be noted that tests have shown that SCD values also vary as the mixing energy changes. This would result in adjustments to the polymer dosing pump speed, which is controlled by the polymer dosing control loop. Tests have shown that when polymer dosage is kept constant and sludge flow rate varied, the SCD reading varies in inverse proportion to the mixing energy. Thus, control of the mixer insert feed plate 45 to maintain constant mixing energy is important, since SCD values are offset by improper mixing control.

Table 1 below lists typical operating values including sludge flow in gallons per minute and throughput in pounds of dry output solids per hour for a system configured as described herein. It should be noted that nothing in the invention constrains such systems to these particular ranges and that systems having other ranges can be also be assembled using suitable component parts.

TABLE 1

| Parameter | Nominal Operating Value | Range | Too Low Alarm | Too High Alarm |
| --- | --- | --- | --- | --- |
| | | | (Both Programmable) | |
| Sludge Flow | 60 gpm | 30-120 gpm | 20 gpm | 140 gpm |
| Mixer Position | 25% | 18-60% | 15% | 80% |
| Cake Thickness | 0.5" | 0.25"-0.75" | 0.15" | 1" |
| Moisture Content | 20% | 15-20% | N/A | N/A |
| Belt Speed | 5 m/min | 1 m/min-20 m/min | N/A | N/A |
| Throughput | 1000 #/hr | 400-1600 #/hr | N/A | N/A |
| % Solids | 3% | 0.7-5% | N/A | N/A |
| Polymer Dosing | 8 #/ton | 5-11 #/ton | N/A | N/A |

Steps 337, 339, 341, and 343 generate corresponding displays and pass control to step 305 where loop termination begins, ultimately returning the system to the manual mode in step 311. If sludge speed and cake thickness are within the programmed limits, step 345 causes the throughput loop to be repeated.

Controller 37 also operates a mixer control loop, which employs an actuator (such as an electric, hydraulic, or pneumatic actuator) that varies the orifice of the mixer according to changes in the sludge flow measured by sensor 49. The input variable is the sludge flow rate and the position of insert feed plate 45 is set based on the difference between the set flow rate and the current flow rate. A sludge flow sensor produces a signal between 4mADC and 20mADC indicating the current rate of sludge flow. A position sensor, which provides a signal between 4mADC and 20mADC, indicates the current position of the insert feed plate 45. The main function of the mixer control loop is to maintain a constant mixing energy for any given sludge volume to achieve consistent flocculation and coagulation. Processor or controller 37 determines the required orifice size or insert feed plate position from a programmed relationship. This is a linear function of measured sludge flow and insert feed plate position.

Slope and offset for the linear function at a particular installation are determined at commissioning time. The commissioning engineer is prompted to set up a number of optimum operating conditions for the beltpress. After each setting, a particular value for sludge flow and mixer positions are stored by the controller 37, at the time when the commissioning engineer presses a button. This is carried out for a number of different sludge flows and consequent mixer positions. The slope and offset are then calculated using a least squares process While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of controlling throughput in a beltpress apparatus, the method comprising the steps of:
    supplying material to be deliquidified by said beltpress to an adjustable output rate feeder;
    supplying said material to said beltpress from an output of said feeder;
    compressing said material in said beltpress into cake and expelling said cake, said compressing step comprising pressing said material between at least two endless belts operating at about a same belt speed;
    measuring on-line a thickness f aid cake and in response to a measured thickness adjusting the output rate of said feeder to obtain a desired thickness of said cake;
    wherein the step of measuring the output cake thickness comprises sensing a thickness of output cake between the two belts at an output portion of said beltpress.

2. The method recited in claim 1 further comprising: mixing a polymer with said material to be deliquified and automatically adjusting mixing energy in response to changes in said controllable rate.

3. The method recited in claim 2 comprising mixing said polymer with said material to be deliquified through an adjustable mixer orifice and adjusting a size of said orifice to obtain said mixing energy.

4. The method recited in claim 3 wherein the step of adjusting the mixer orifice comprises setting an insert feed plate to a position between zero per cent open and 100% open.

5. The method recited in claim 2 comprising measuring on-line an electrical charge of a filtrate produced in said beltpress and adjusting a polymer injection device to obtain a desired charge on said filtrate.

6. The method recited in claim 1 further comprising measuring said belt speed on-line and further adjusting said output rate of said feeder.

7. The method recited in claim 1 wherein said cake thickness and said belt speed determine a volume of output cake per unit time, the method further comprising determining a rate of output of dry solids per unit time as a product of said belt speed, said volume of output cake per unit time, and a percentage of dry solids in said output cake.

8. The method recited in claim 1 further comprising detecting a distance between said two belts.

9. The method recited in claim 8 wherein said distance between said two belts is determined by measuring a position of a variable position first belt relative to a fixed position of a second belt.

10. The method recited in claim 9 further comprising locating a sensor in contact with said first belt.

11. The method recited in claim 10 further comprising sensing a position of said sensor with at least one of a proximity sensing device, an optical device and an ultrasonic device.

12. The method recited in claim 1 comprising measuring on-line output cake thickness at a plurality of locations along a width of said output cake and averaging said measured thicknesses to obtain said cake thickness.

13. The method recited in claim 1 comprising measuring on-line said thickness of said output cake at predetermined intervals.

14. An apparatus for controlling throughput in a beltpress comprising:
a controllable mass delivery device arranged to supply, at a controllable rate, material to be deliquified by said beltpress;
a conveyor arranged to convey said material through said beltpress, compress said material into cake and expel said cake from an output;
at least one on-line thickness sensor arranged to measure thickness of aid cakes at said output, an output of said sensor being routed to provide information of aid thickness to said controllable mass delivery device;
said controllable mass delivery device being responsive to said thickness information to adjust said controllable rate to obtain a desired thickness of said cake;
wherein the conveyor comprises at least two endless belts operating at about a same belt speed, the material to be liquified being sandwiched between the belts; and
wherein said output cake thickness sensor measures a thickness of output cake between the two belts at an output portion of said beltpress.

15. The apparatus recited in claim 14 wherein said sensor measures a distance between said two belts.

16. The apparatus recited in claim 15 wherein said sensor determines said distance between said two belts by measuring a position of a variable position first belt relative to a fixed position of a second belt.

17. The apparatus recited in claim 16 wherein said sensor is in contact with said first belt.

18. The apparatus recited in claim 17 wherein said sensor comprises at least one of a proximity sensing device, an optical device and an ultrasonic device.

19. The apparatus recited in claim 7 wherein said on-line thickness sensor comprises a proximity sensor having a transition portion pivotally connected to said sensor to vary a distance between said sensor and a target as said cake thickness varies.

20. The apparatus recited in claim 14 comprising:
a plurality of thickness sensors for measuring on-line output cake thickness at a plurality of locations along a width of said output cake, and
wherein a processor averages said measured thicknesses to obtain said cake thickness.

21. The apparatus recited in claim 14 comprising a timer controlling on-line measurement of said thickness of said output cakes at predetermined intervals.

22. The apparatus recited in claim 14 wherein a transition portion of aid sensor translates a range of cake thicknesses to a range compatible with said on-line thickness sensor.

23. The apparatus recited in claim 14 wherein said on-line thickness sensor comprises a proximity sensor having a transition portion pivotally connected to said sensor to vary a distance between said senor and a target as said cake thickness varies.

24. The apparatus recited in claim 23 wherein said transition portion has an upper portion linked to the sensor and a lower portion contacting a variable position first belt.

25. The apparatus recited in claim 14 further comprising:
a polymer mixing device wherein a polymer is mixed with said material to be deliquified, said mixing device being responsive to changes in said controllable rate to adjust said mixing energy.

26. The apparatus recited in claim 25 wherein said polymer mixing device comprises an adjustable mixer orifice, a size of said orifice being adjustable to obtain said mixing energy.

27. The apparatus recited in claim 26 comprising:
a streaming current detector for measuring on-line an electrical charge of a filtrate produced in said beltpress, and
a polymer injection device responsive to an output of said streaming current detector, said polymer injection device delivering polymer to said sludge to obtain a desired charge on said filtrate.

28. The apparatus recited in claim 25 wherein said adjustable mixer orifice comprises a insert feed plate adjustable to a position between zero per cent open and 100% open.

29. The apparatus recited in claim 14 further comprising an on-line belt speed detector having an output used by a control loop in adjusting said controllable rate.

30. The apparatus recited in claim 14 further comprising a processor, the processor determining a volume of output cake per unit time from said cake thickness and said belt speed, and a rate of output of dry solids per unit time as a product of said volume of output cake per unit time, and a percentage of dry solids in said output cake.

* * * * *

UNITED STATES PATENT AND TRADEMARK OFFICE
CERTIFICATE OF CORRECTION

PATENT NO. : 5,133,872
DATED : July 28, 1992
INVENTOR(S) : Peter I. BALDWIN, et al.

It is certified that error appears in the above-identified patent and that said Letters Patent is hereby corrected as shown below:

Column 4, line 52, "arrived a" should read --arrive at--.
Column 4, line 53, "in the time" should read --in time--.
Column 8, line 44, "THVIP" should read -- THVIP= --.
Column 10, line 47, "deliquidified" should read --deliquified--.
Column 11, line 49, "aid" should read --said--.
Column 11, line 51, "aid" should read --said--.
Column 12, line 23, "aid" should read --said--.
Column 12, line 29, "senor" should read --sensor--.

Signed and Sealed this

Seventh Day of December, 1993

Attest:

BRUCE LEHMAN

Attesting Officer

Commissioner of Patents and Trademarks